United States Patent
Markley

(10) Patent No.: US 6,592,483 B2
(45) Date of Patent: Jul. 15, 2003

(54) CVT CHAIN-BELT HAVING WEAR PADS EXTENDING FROM WEAR LINKS WHEREIN PADS ARE POSITIONED AT OR BETWEEN JOINT/PIN ENDS

(75) Inventor: George L. Markley, Montour Falls, NY (US)

(73) Assignee: Borgwarner Inc., Auburn Hills, MI (US)

( * ) Notice: Subject to any disclaimer, the term of this patent is extended or adjusted under 35 U.S.C. 154(b) by 0 days.

(21) Appl. No.: 09/855,933

(22) Filed: May 15, 2001

(65) Prior Publication Data

US 2002/0173396 A1 Nov. 21, 2002

(51) Int. Cl.[7] .................................................. F16G 1/22
(52) U.S. Cl. ........................ 474/244; 474/201; 474/245
(58) Field of Search ................................ 474/201, 230, 474/242, 243, 244, 245

(56) References Cited

U.S. PATENT DOCUMENTS

| | | | | |
|---|---|---|---|---|
| 779,253 A | * | 1/1905 | Bayliss | 474/201 |
| 1,113,746 A | * | 10/1914 | Bohlman | 474/242 |
| 1,424,767 A | * | 8/1922 | Mesinger | 474/245 |
| 1,424,768 A | * | 8/1922 | Mesinger | 474/245 |
| 1,476,603 A | * | 12/1923 | Firminger | 474/149 |
| 1,511,396 A | * | 10/1924 | Champney et al. | 24/33 P |
| 1,878,797 A | * | 9/1932 | Morse | 474/242 |
| 2,913,916 A | * | 11/1959 | Schmidt | 474/201 |
| 3,431,724 A | | 3/1969 | Steuer | 59/35 |
| 4,313,730 A | * | 2/1982 | Cole et al. | 474/201 |
| 4,464,152 A | * | 8/1984 | Kern | 474/201 |
| 4,569,671 A | | 2/1986 | Ledvina | 474/201 |
| 4,643,703 A | * | 2/1987 | Yasuda et al. | 474/242 |
| 4,718,881 A | * | 1/1988 | Sugimoto et al. | 474/201 |
| 4,738,654 A | * | 4/1988 | Cole, Jr. | 474/219 |
| 4,790,799 A | * | 12/1988 | Sadler | 474/268 |
| 4,944,715 A | | 7/1990 | Ueda et al. | 474/245 |
| 4,998,901 A | | 3/1991 | Adler et al. | 445/3 |
| 5,052,985 A | | 10/1991 | Masuda et al. | 474/245 |
| 5,176,587 A | * | 1/1993 | Mott | 474/216 |
| 5,306,214 A | | 4/1994 | Masuda et al. | 474/245 |

* cited by examiner

*Primary Examiner*—Thomas R. Hannon
*Assistant Examiner*—Vicky A. Johnson
(74) *Attorney, Agent, or Firm*—Brown & Michaels, PC; Greg Dziegielewski

(57) ABSTRACT

A chain-belt for a CVT having a plurality of links, each link comprising a plurality of parallel tensile link plates, each link plate having connection apertures located substantially towards the ends thereof, each link being connected to an adjacent link by a pin having two ends passing through overlapping connection apertures in adjacent link plates. Wear pads are positioned on said outer link plates. A bushing, at least as long as the thickness of the tensile link plates, coaxially surrounds the chain's pins, passing through oversized holes in the link plates. Compressive force is transmitted between the wear pads by the bushing, so that the compressive force exerted by the sheaves does not deform the pin or squeeze the link plates together. The wear pads are centered on the centerline of the chain, and taper to match the taper of the pulley sheaves. The wear pads are also designed so the centerline of the wear pads intersects the center axis of the pulley when the chain is in use.

4 Claims, 3 Drawing Sheets

CVT CHAIN-BELT HAVING WEAR PADS
EXTENDING FROM WEAR LINKS
WHEREIN PADS ARE POSITIONED AT OR
BETWEEN JOINT/PIN ENDS

BACKGROUND OF THE INVENTION

1. Field of the Invention

The invention pertains to the field of mechanical power transmission chains for continuously variable transmissions. More particularly, the invention pertains to a CVT chain-belt of the link-and-pin type.

2. Description of Related Art

In recent years, significant research and development has been devoted to practical continuously variable transmissions (CVT) for automotive applications. A CVT provides a portion of the mechanical link between the vehicle engine and the drive wheels used to control the torque output of the engine.

A CVT generally operates by the use of multiple variable pulleys mounted on parallel axes, connected by an endless chain-belt, typically comprising metal or elastomeric materials. A first variable pulley is situated on an input shaft and is mechanically driven by the vehicle engine. A second variable pulley is mounted on an output shaft and is driven by the first pulley through the chain-belt. The second pulley acts through additional drive components to transmit torque to the vehicle drive wheels. Each pulley rotates about an independent shaft and is formed by the cooperation of two pulley sheaves, one of which is axially movable in a direction opposite from the other. The sheave pairs, mounted on the pulley axis, form the inner faces of the pulley. The profiles of the inner faces are generally inclined, such that the two sheave inner faces tend to converge toward the pulley axis. When at least one of the sheaves is movable axially relative to the other sheave, variation in the distance separating the opposing inner faces can be obtained.

The contact surface of the chain or belt, which serves as a power transmission element, engages the inner faces of the pulley sheaves and transmits torque by friction. Most conventional load block configurations include load blocks having a contact surface which is a plane surface. In such configurations, the contacts with conventional conical sheaves are line contacts (i.e., where the contacted area is a band) and not point contacts. As the chain-belt passes over the pulley, the point where the load block or link articulates is defined as the pitch-line. The pitch (p) is the distance between successive articulations.

During the operation of the CVT, a movable sheave on the first pulley may be translated axially along the pulley axis so as to increase or decrease the distance separating the sheave inner faces of the first pulley. At the same time, a movable sheave on the second pulley decreases or increases the distance separating the sheave inner faces of the second pulley, thus maintaining the total required chain length for the loop around the two pulleys.

As the sheave members are translated along the axis of the pulley, the effective pulley radius is increased or decreased due to the inclined inner face of the sheave. The location of the chain-belt articulation or neutral axis (i.e., the pitch-line) around the intermediate circumference of the pulley inner faces defines the effective radius of the pulley. As the sheave inner face separation distance of the first pulley decreases, the chain-belt is forced to adopt its contact at a larger radial distance as it rises up along the inclined sheave inner face and the pitch-line is changed. Simultaneously, the effective radius of the second pulley is proportionately decreased by the separation of the pulley sheaves therein. Similar to the first pulley, the chain-belt is forced to adopt its contact at a smaller radial distance and the pitch-line is changed. Thus, the ratio of the pulley radii may be varied continuously to obtain the desired final drive ratio for the specific vehicle operating conditions. Through this process the CVT changes the "gear" ratio of the transmission—the ratio of the speeds of the input and output shafts—in a continuous fashion.

Typically the inclined inner pulley sheave faces are generally linear (conical). However, curved profile inner sheave faces also are used to reduce the overall profile of the CVT pulleys.

In the past, the most common configuration for the chain-belt which mechanically links the pulleys has been a conventional chain-belt having a plurality of interconnected load blocks, and may have a variety of link and block configurations, e.g. pin or rocker chains, link belts, etc. Such a chain transmits power in a conventional way by transmitting a pulling force through the links and pins of the chain. This type of chain has drawbacks in CVT service, because of the very large compression force required to transmit power from the sheaves to the transmission belt. When a conventional chain is used in a CVT, this compressive force causes the chain to wear and can deform the pins and links of the chain.

Various attempts have been made in the prior art to address the problem of CVT chain wear. U.S. Pat. No. 3,431,724 to Steuer discloses a chain having links of unitary construction with wear pads located in the center of the outer surface of the links. U.S. Pat. No. 4,944,715 to Ueda et al. discloses a chain wherein the outer link plates include central wear pads that are integral with the chain link plates. However, one problem with such prior art chains is that, because the wear pads are located on the chain links themselves, the large compression force of the CVT pulleys squeezes the chain links together, thereby generating unwanted friction between facing pairs of link plates, and potentially bending or crushing the links. U.S. Pat. Nos. 5,052,985 and 5,306,214 to Masuda et al. disclose chains having wear pads located over the pins. One problem with these prior art chains is that, because the wear pads are located over the pins, the large compression force of the CVT pulleys squeezes the pins, thereby potentially bending the pins or damaging the corresponding links. In a multi-plate link chain, the compression of the outer plates with the load blocks can squeeze the inner links together, creating increased resistance to the necessary bending of the chain.

SUMMARY OF THE INVENTION

A chain-belt for a CVT having a plurality of links, each link comprising a plurality of parallel tensile link plates, each link plate having connection apertures located substantially towards the ends thereof, each link being connected to an adjacent link by a pin having two ends passing through overlapping connection apertures in adjacent link plates. Wear pads are positioned on said outer link plates. A bushing, at least as long as the thickness of the tensile link plates, coaxially surrounds the chain's pins, passing through oversized holes in the link plates. Compressive force is transmitted between the wear pads by the bushing, so that the compressive force exerted by the sheaves does not deform the pin or squeeze the link plates together. The wear pads are centered on the centerline of the chain, and taper to match the taper of the pulley sheaves. The wear pads are also designed so the centerline of the wear pads intersects the center axis of the pulley when the chain is in use.

For a better understanding of these and other aspects of the invention, reference should be made to the following detailed description taken in conjunction with the accompanying figures.

DETAILED DESCRIPTION OF THE INVENTION

The invention is a chain-belt for use in a continuously variable transmission, such as, for example, the type having the pulley halves or "sheaves" move axially together and apart, shortening or lengthening the distance between at a given radial distance. The chain-belt of the invention has a definite width including radial wear pads, preferably emanating along and from the center axis of the pulley and at the same angle as the pulley surface. The wear pads make near line contact with the pulley regardless of radial location, because they are positioned relative to the pins. According to one embodiment, the width of the wear pads is relatively narrow, but sufficient to account for minor variances, and the sides are angled or parallel. The length can be as needed to provide the friction for transmitting the required torque.

Figure 1:
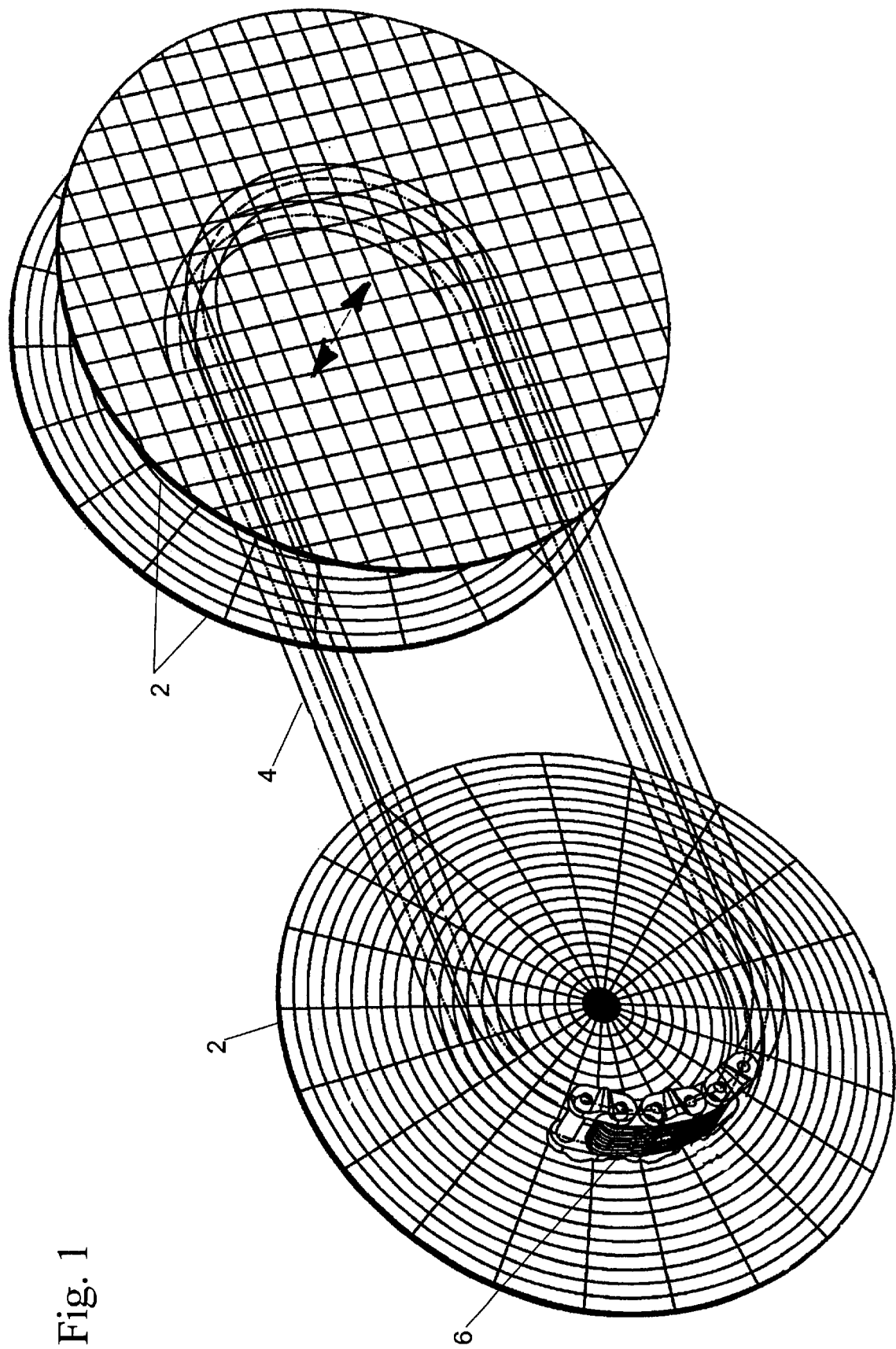
FIG. 1 shows a cut-away view of the moveable pulley halves (minus one) of a CVT, to illustrate the chain path and a segment of chain at 1:1 drive phase.

FIG. 1 shows a cut-away view of the moveable pulley halves 2 of a CVT, to illustrate the chain path 4 and a segment of chain 6 at 1:1 drive phase (i.e. at the same radial location in each pulley). One sheave 2 is omitted, so as to show the chain links 6.

Figure 2:
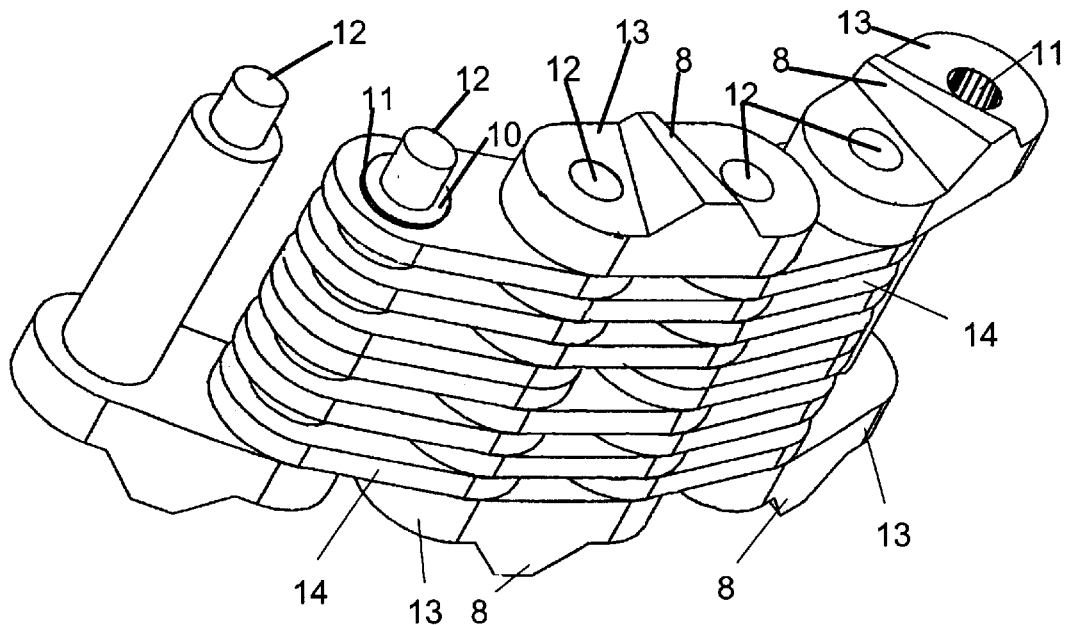
FIG. 2 shows a segment of chain illustrating the components of the present invention.
Figure 3:
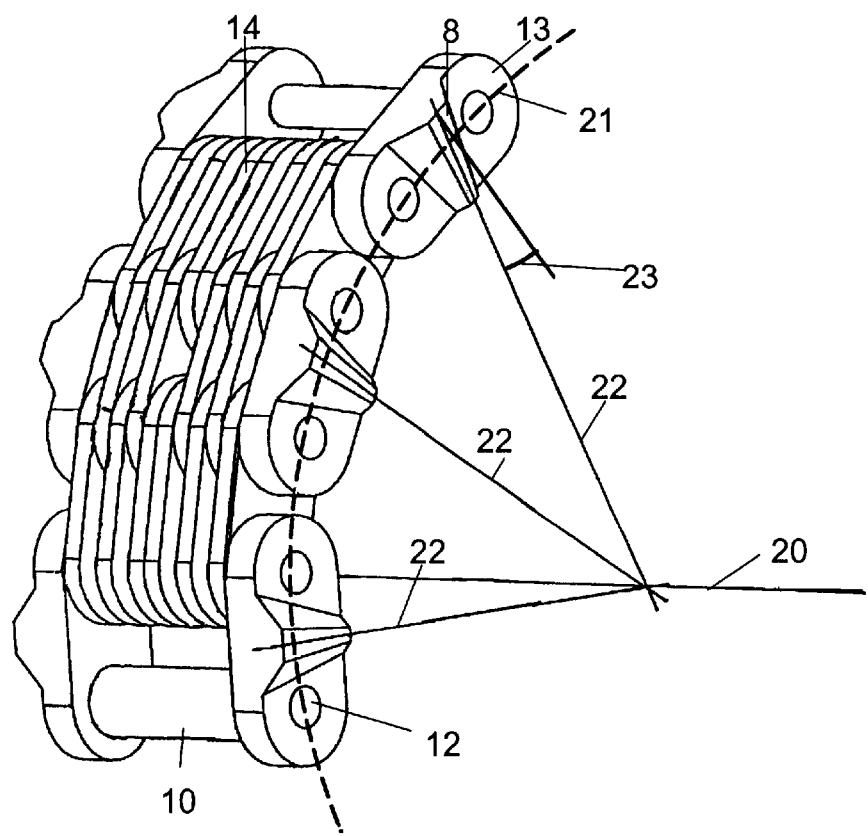
FIG. 3 shows a segment of the chain-belt of the present invention to illustrate how the wear pad surfaces match the pulley's cone angle and how the wear pad is centered around and emanating from the pulley axis and bisecting the chain pitch line between two pins.

Referring to FIG. 2, a segment of chain is shown to illustrate the components of the present invention. The CVT chain-belt of the invention comprises a chain having a plurality of links, each link comprising a plurality of inner 14 tensile link plates with a pair of and outer 13 links on each side. The outer links 13 have wear pads 8 for frictional contact with the sheaves. In the embodiment of FIGS. 1–3, the wear pads 8 are located midway between the ends of the outer links 13.

Each link plate 13 or 14 has connection apertures 11 located substantially towards the ends thereof. Each link is connected to an adjacent link by a pin 12 passing through overlapping connection apertures 11 in adjacent link plates. Pins 12 are surrounded by bushings 10. The diameter of the opening in bushing 10 and the diameter of pin 12 can be chosen such that they couple in a tight interference fit, or might be loose. Similarly, the tensile links 14 can be a relatively loose fit over bushings 10, to allow rotation of the links about the bushings, or might be a tight fit. The outer links 13 fit fairly tightly to the pin 12 to retain the outer links in position.

The length of the bushing 10 is preferably approximately the same as the total thickness of the stacked inner links 14, so that when the holes 11 in the outer links 13 are fit onto the pins 12, the inner surface of the outer links 13 presses against the ends of the bushing 10. In that way, any compressive force applied to the wear pads 8, and thus to the outer links 13, will be transmitted to the bushings 10, and not to the inner links 14 or the pin 12. The pin 12 will only see the tensile loads of the chain, and will not be deformed or buckle under compressive load, and the inner links will not be squeezed and bind together. Alternatively, the bushings 10 might be made slightly longer than the total thickness of the inner links, but still less than the length of the pins 12, and the holes 11 in the outer links 13 could then be made in a stepped fashion with a larger diameter part toward the inside and a smaller diameter part to the outside, so that the bushings 10 would bottom out in a larger diameter part of the holes, and the pin pass through to a smaller diameter part.

The lacing of the tensile links, their thickness and the number used (which controls the chain width) are determined by chain load, as well as many other conditions, with which one of ordinary skill in the art is quite familiar.

Referring to FIG. 3, a segment of the chain-belt of the present invention is shown to illustrate the shape of the wear pad 8 surfaces. The wear pads 8 are centered on the centerline of the chain 21, and are not only tapered to match the angle 23 of the sheave against which they will be in contact, but are also tapered such that the line 22 of the wear pads 8 intersects at the centerline 20 of the pulley shaft.

Figure 4:
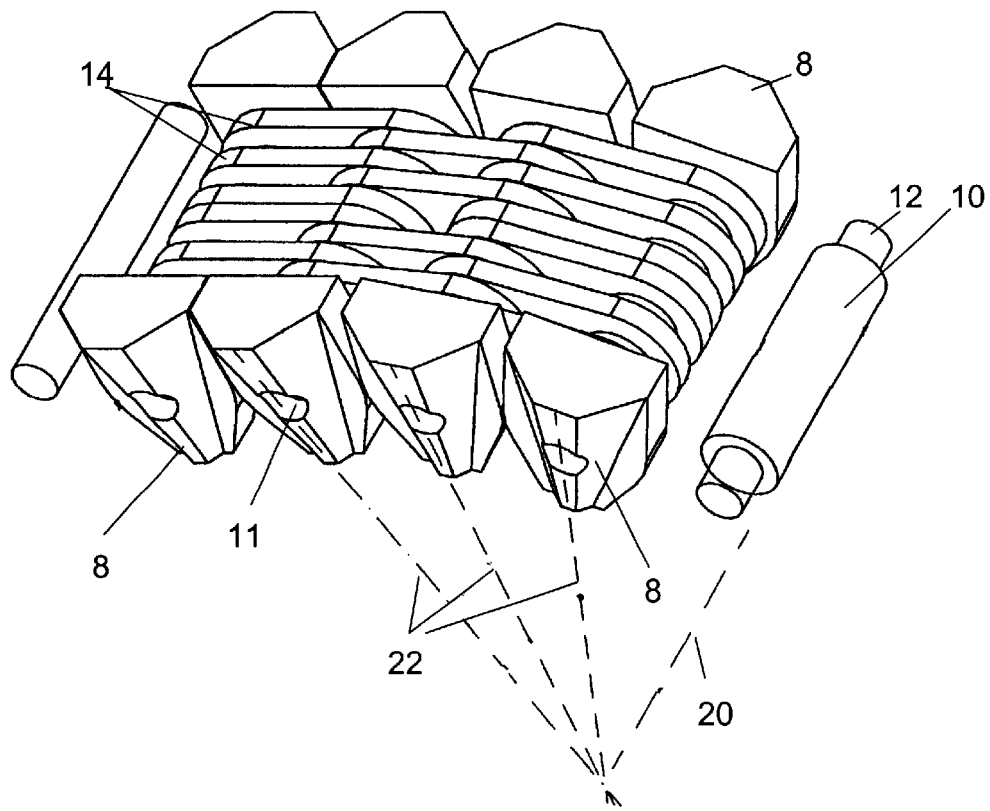
FIG. 4 shows a segment of chain to illustrate the components of an alternate embodiment of the present invention, wherein twice as many wear pads are used, by attaching a wear pad to each end of each pin.

FIG. 4 shows a segment of chain illustrating the components of an alternate embodiment of the present invention, wherein the outer links are the wear pads, with a wear pad 8 located at each end of each pin 12, rather than equidistant between the pins. In this embodiment, there would be twice as many wear pads as in the first embodiment described above, and the compressive force would be transmitted directly from the wear pad 8 to the bushing 10, rather than through a separate outer link 13 (FIG. 1). The other construction details—inner links 14, pins 12, bushings 10, are as described above.

Figure 5:
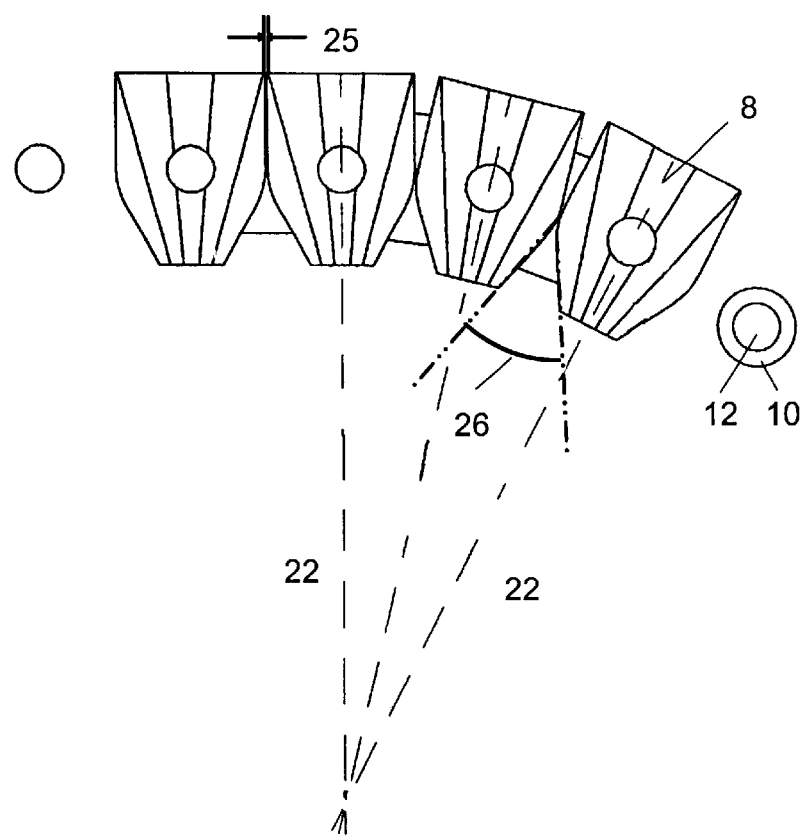
FIG. 5 illustrates how a minimal clearance between the wear pads from the pin to the large end keeps the pad surfaces aligned in the straight strand for proper engagement with the pulley cones.

Referring now to FIG. 5, a minimal clearance 24 between the wear pads 8 from the pin to the large end keeps the pad surfaces aligned in the straight strand for proper engagement with the center axis [20] of the pulley. A relief angle 23 from the pin to the small end allows for the chain to wrap the smallest diameter pulley condition.

Contact of the pulley cones is through the centerline of the chain. Use of the bushing 10 around pin 12 causes the load to be transmitted through the chain, thus pins 12 only see tensile load through the chain length, and the compressive force of the pulleys is put on the bushings 10, not on the pins themselves. Various materials and processes are applicable to the components of the invention, depending on the intended application. For example, friction is one consideration when choosing the wear pad material, composition and surface finish. Other variations to the embodiments described herein are contemplated, such as, for example: combining pin and bushing into a stepped pin; riveting the pin to the wear link; adding a washer between the bushing end and the wear link.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain-belt for a CVT having multiple variable pulleys mounted on shafts having an axis, the pulleys having tapered inward-facing contact surfaces, comprising:
   a) a plurality of links, each link comprising a plurality of parallel tensile link plates (14), each of the link plates having a length and a thickness and connection apertures (11) located substantially towards the ends thereof;
   b) a plurality of cylindrical bushings (10) passing through the connection apertures in the link plates, each having a hollow center and a length at least equal to a total thickness of the link plates across the chain belt;
   c) a plurality of cylindrical pins (12) passing through the hollow center of each of the bushings, each having a length greater than the length of the bushings; and
   d) a plurality of wear pads (8) on an outside of each link, where an inside surface of each wear pad contacts an end of the bushings such that compressive force is transmitted from wear pad to opposing wear pad through the bushings, each wear pad being centered along a centerline of the chain, and tapered to mate with the contact surfaces of the pulleys.

2. The chain-belt of claim 1, wherein the wear pads are located at the pins, so that the wear pads transmit compressive force by pressing against the ends of the bushings.

3. The chain-belt of claim 1, in which the links further comprise outer link plates (13), parallel to the tensile link plates, the wear pads are located on the outer link plates midway between the pins, so that the wear pads transmit compressive force to the outer link plates, and then to the bushings by the outer plates pressing against the ends of the bushings.

4. The chain-belt of claim 1, wherein said wear pads have a centerline (22), and when the wear pads of the chain-belt are in contact with the contact surfaces of the pulley, the centerline of the wear pads, extended radially inward, intersects the axis (20) of the pulley shaft.

* * * * *